Figure 1:
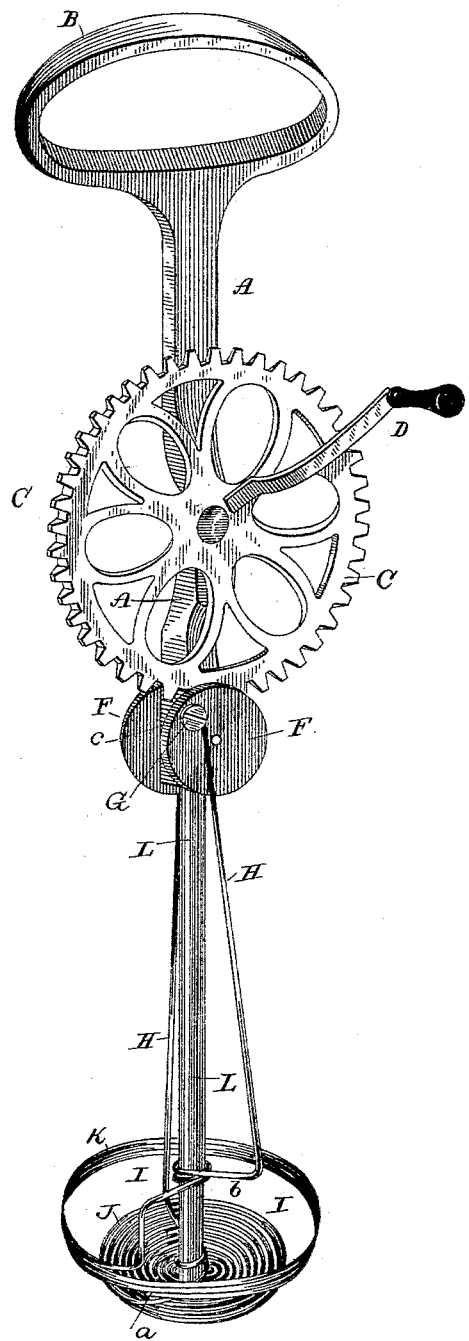

(No Model.) 2 Sheets—Sheet 1.
G. H. THOMAS.
EGG BEATER.

No. 331,662. Patented Dec. 1, 1885.

Attest:
Elliott P. Hough.
C. E. Jones.

Inventor:
George H. Thomas.
By Chas. J. Gooch
his Attorney.

(No Model.) 2 Sheets—Sheet 2.
G. H. THOMAS.
EGG BEATER.
No. 331,662. Patented Dec. 1, 1885.
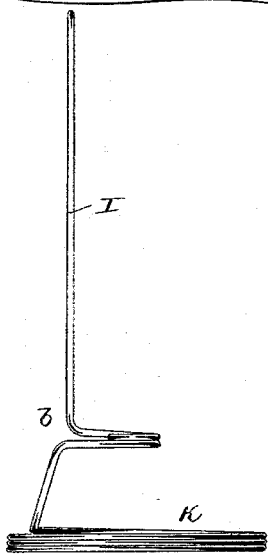
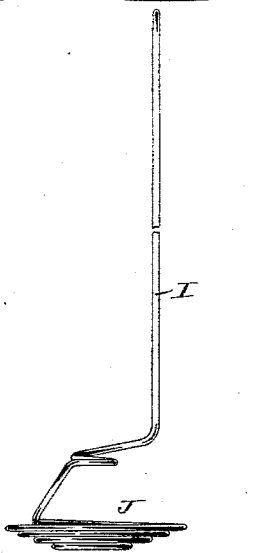
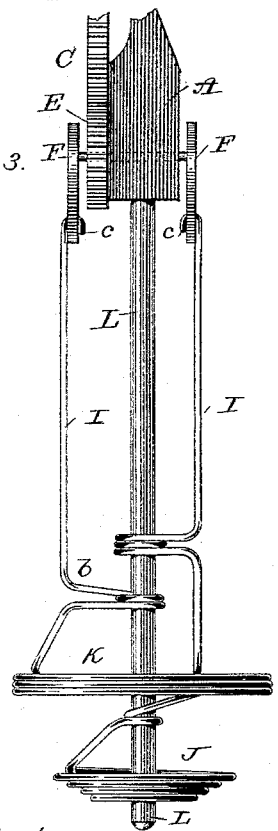
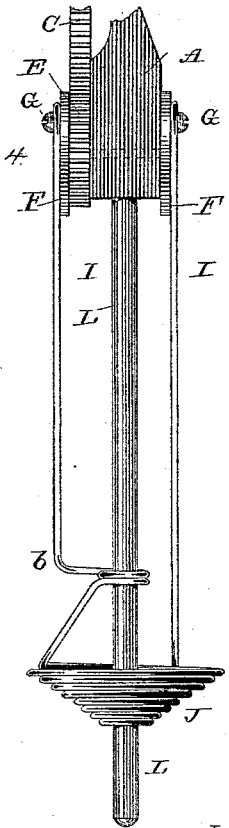
Attest:
Elliott P. Hough.
C. E. Jones.
Inventor:
George H. Thomas.
By Chas J. Gooch
his attorney

UNITED STATES PATENT OFFICE.

GEORGE H. THOMAS, OF CHICOPEE FALLS, MASSACHUSETTS.

EGG-BEATER.

SPECIFICATION forming part of Letters Patent No. 331,662, dated December 1, 1885.

Application filed May 2, 1885. Serial No. 164,262. (No model.)

*To all whom it may concern:*

Be it known that I, GEORGE H. THOMAS, a citizen of the United States of America, residing at Chicopee Falls, in the county of Hampden and State of Massachusetts, have invented certain new and useful Improvements in Egg-Beaters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of egg-beaters having one or more vertically-reciprocating dashers. Mounted within the frame are the customary gear-wheels by means of which the dashers are operated. Connecting with the drive-wheel and having bearing within the frame are one or more eccentric disks, which, by means of a rod or arm, is connected with a dasher or beater in order that upon the drive-wheel being rotated said eccentric disk or disks will rotate and reciprocate the dashers or beaters connected therewith, all as hereinafter described and claimed.

In the accompanying drawings, Figure 1 represents a perspective view of an egg-beater constructed according to my invention. Fig. 2 represents detail views of the dashers or beaters. Figs. 3 and 4 represent modifications in the construction of parts of the device.

In the illustration shown in the drawings the egg-beater is shown as having two dashers or beaters.

A represents the frame or handle, which has at its upper end a hand-grasp, B, of any suitable shape or design.

C represents a drive wheel or gear pivoted in the frame, and having a lever or handle, D, connected thereto for rotating the same. E represents a toothed pinion journaled in the lower end of the frame and meshing with the teeth or gears in the drive-wheel C. Connected to the lower end of the frame A and to the pinion E, with capability of rotating upon said pinion being rotated, are disks F F, one on each side of the frame, from the outer face of each of which extends eccentrically a pin, screw, or stud, G, with which the upper ends of the wires or rods H H, connecting or formed with the dashers or beaters I, connect. As represented in the drawings, there are two dashers or beaters, I I, each formed by coiling a length of wire in a circularly-horizontal direction, one of said dashers or beaters I having a flat or nearly flat horizontal coil, J, while the other beater is formed with a coil, K, of greater circumference, formed by coiling the wire into one or more rings, according to the strength desired. When more than one ring is formed, the additional rings extend the one above the other, as clearly represented in the drawings, so as to afford a clear open central space within which the smaller and more compact coil, J, can readily reciprocate, said construction also permitting of the larger coil, K, reciprocating across the path of the beater having the small coil.

As represented in the drawings, the wires forming the respective dashers are first coiled to the size desired, one end of the wire being soldered or otherwise suitably attached to the coil, as at *a*. Then, when the coil is completed, the free end of the wire in each case is extended upward and inward, and coiled loosely around the rod or stem L, or an extension of the frame extending downwardly from the lower end thereof. It is then extended outwardly therefrom, as at *b*, to bring it in line with the outer faces of the eccentric disks, to which the free ends of the wires are then connected either by coiling the same around a projection, pin, screw, or equivalent, *c*, thereon and eccentric thereof, or by directly attaching said wires to said disks, as may be preferred.

While I have shown the disks F as of circular form and with a pin or its equivalent, G, extending eccentrically therefrom, it is evident that such an arrangement may be modified by constructing the disks of eccentric form and attaching the upper ends of the wires directly thereto, as in Fig. 3. Similarly, the number of beaters or dashers may be either increased or diminished, as desired.

A person desiring to use the beater for the purpose of beating together or mixing eggs or other articles of food of a liquid, semi-liquid, or granulated or powdered character, will place the beaters in contact with such substance or substances, and, grasping the hand-grasp B with one hand, with the other hand rotate the gear or drive wheel C, whereupon said wheel C will communicate rotary motion to the pinion E, meshing therewith, and that in its turn will rotate the disk or disks F, which, as they revolve, will draw around with them the upper ends of the wires connecting said disks with the beaters and cause the beaters to reciprocate vertically along the stem L. Where more than one beater is employed, the connection of each with their respective disks is at a different degree of eccentricity to that of the other. By this means I insure the beaters reciprocating vertically in opposite directions during the whole or a portion of their movement. By adjusting the eccentric position of the connection of the beaters with the disks the extent of this difference of movement of the respective beaters can be readily regulated.

The length of stroke of the beaters during their reciprocation can be readily increased or diminished by either increasing or decreasing the size, circumferentially, of the eccentric disks.

I am aware that churns have been constructed with dashers rigidly attached to the lower ends of dasher-shafts, and said shafts connected to crank-axles, and also that a churn has been made with two dashers similarly connected and operated, one dasher having a central orifice, through which another dasher may reciprocate. Such construction, however, I do not claim.

Having thus described my invention, what I claim is—

1. An egg-beater having a suitable frame and hand-grasp, operative mechanism journaled within said frame, and horizontally-coiled wire dashers connected to said operative mechanism and adapted to alternately reciprocate vertically, substantially as set forth.

2. An egg-beater having a handle or frame provided with a hand-grasp and having at its lower end a depending rod, one or more disks journaled in said frame, suitable operative mechanism journaled in said frame and adapted to engage with and rotate said disks, and one or more dashers loosely connected to the rod depending from the frame and having eccentric connection with the disks, substantially as and for the purpose set forth.

3. An egg-beater having a frame or handle, suitable operating mechanism mounted thereon, one or more disks or wheels mounted in said frame and connected with said operative mechanism, and one or more coiled-wire dashers eccentrically connected with the disk or disks.

4. An egg-beater frame or handle having an outwardly-extending shaft or arm, one or more disks or wheels pivotally mounted upon said frame, suitable gearing connected with and adapted to rotate said disks or wheels, horizontally coiled-wire dashers having eccentric connection with said disks and adapted to reciprocate upon the shaft or arm, substantially as and for the purpose set forth.

5. An egg-beater having mounted thereon disks and suitable mechanism for rotating the same, an outwardly-extending shaft or rod, horizontally-coiled wire dashers of unequal circumference, to permit of the smaller dasher reciprocating through the larger, each dasher having a rod or wire connecting with said disk and adapted to slide along the shaft upon the rotation of said disks and vertically reciprocate the dashers, substantially as set forth.

In testimony whereof I affix my signature in presence of two witnesses.

GEORGE H. THOMAS.

Witnesses:
JAMES N. LOOMIS,
SIDNEY SANDERS.